United States Patent
Matsunaga

(10) Patent No.: US 11,872,983 B2
(45) Date of Patent: Jan. 16, 2024

(54) VEHICLE COLLISION PREDICTION APPARATUS

(71) Applicant: DENSO CORPORATION, Kariya (JP)

(72) Inventor: Shogo Matsunaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 509 days.

(21) Appl. No.: 17/075,977

(22) Filed: Oct. 21, 2020

(65) Prior Publication Data
US 2021/0031762 A1 Feb. 4, 2021

Related U.S. Application Data

(63) Continuation of application No. PCT/JP2019/016263, filed on Apr. 16, 2019.

(30) Foreign Application Priority Data

Apr. 23, 2018 (JP) ................. 2018-082089

(51) Int. Cl.
*B60W 30/095* (2012.01)
*B60W 30/09* (2012.01)
*B60W 50/14* (2020.01)

(52) U.S. Cl.
CPC .......... *B60W 30/095* (2013.01); *B60W 30/09* (2013.01); *B60W 50/14* (2013.01); *B60W 2554/404* (2020.02)

(58) Field of Classification Search
CPC .... B60W 30/095; B60W 30/09; B60W 50/14; B60W 2554/404; B60W 30/0956; G08G 1/16
See application file for complete search history.

(56) References Cited

U.S. PATENT DOCUMENTS

| 9,248,834 B1* | 2/2016 | Ferguson .......... B60W 50/0097 |
| 2008/0312832 A1* | 12/2008 | Greene .................. G08G 1/166 |
| | | 701/301 |
| 2010/0324823 A1 | 12/2010 | Kobayashi et al. |
| 2011/0121992 A1 | 5/2011 | Konaka et al. |

(Continued)

FOREIGN PATENT DOCUMENTS

| JP | 2007099237 A * | 4/2007 |
| JP | 2016-015043 A | 1/2016 |

(Continued)

*Primary Examiner* — Donald J Wallace
*Assistant Examiner* — Daniel M. Robert
(74) *Attorney, Agent, or Firm* — MASCHOFF BRENNAN

(57) ABSTRACT

A vehicle collision prediction apparatus, installable to a host vehicle that is equipped with a peripheral sensor for detecting a preceding vehicle, includes a collision prediction region setting section that sets a collision prediction region in front of the host vehicle and a collision prediction section which predicts that there is a probability of a collision between the host vehicle and the preceding vehicle if the preceding vehicle is within the collision prediction region; wherein in response to the preceding vehicle satisfying predetermined U-turn conditions for estimating that the preceding vehicle is executing a U-turn, the collision prediction region setting section expands the collision prediction region, making the collision prediction region larger than in response to the preceding vehicle not satisfying the U-turn conditions.

9 Claims, 8 Drawing Sheets

(56) References Cited

U.S. PATENT DOCUMENTS

| | | | | |
|---|---|---|---|---|
| 2018/0229725 A1* | 8/2018 | Akama | ................ | B60W 40/00 |
| 2018/0297591 A1 | 10/2018 | Minemura | | |
| 2018/0366001 A1 | 12/2018 | Matsunaga | | |
| 2019/0001973 A1 | 1/2019 | Matsunaga | | |
| 2019/0101924 A1* | 4/2019 | Styler | ................ | G05D 1/0088 |
| 2020/0081442 A1* | 3/2020 | Kizumi | ................ | B60W 30/00 |
| 2021/0031762 A1* | 2/2021 | Matsunaga | ........... | B60W 50/14 |

FOREIGN PATENT DOCUMENTS

| | | |
|---|---|---|
| JP | 2016-130129 A | 7/2016 |
| JP | 2018-52328 A | 4/2018 |

* cited by examiner

VEHICLE COLLISION PREDICTION APPARATUS

CROSS-REFERENCE TO RELATED APPLICATION

This application is the U.S. bypass application of International Application No. PCT/JP2019/016263 filed on Apr. 16, 2019 which designated the U.S. and claims priority to Japanese Patent Application No. 2018-82089 filed on Apr. 23, 2018, the contents of both of which are incorporated herein by reference.

TECHNICAL FIELD

The present disclosure relates to a vehicle collision prediction apparatus.

BACKGROUND

Vehicle collision prediction apparatuses are known which warn a driver when it is predicted that a host vehicle may be in a collision. With the vehicle collision prediction apparatus described in Japanese Patent Publication No. 2011-22990, when another vehicle is detected at a predicted travel position of the host vehicle, it is predicted that a collision may occur.

SUMMARY

According to one aspect of the present disclosure, a vehicle collision prediction apparatus is provided, which is installable to a host vehicle equipped with a peripheral sensor for detecting a preceding vehicle. The vehicle collision prediction apparatus includes a collision prediction region setting section that sets a collision prediction region in front of the host vehicle, and a collision prediction section which predicts that there is a probability of a collision between the host vehicle and the preceding vehicle, when the preceding vehicle is within the collision prediction region. If the preceding vehicle satisfies predetermined U-turn conditions for estimating that the preceding vehicle is executing a U-turn, the collision prediction region setting section expands the collision prediction region, making the collision prediction region larger than in response to the preceding vehicle not satisfying the U-turn conditions.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

The prior art does not consider a case in which the preceding vehicle executes a U-turn. The assignee of the present application has found that when the preceding vehicle executes a U-turn, the prediction of the probability of a collision with the preceding vehicle may be delayed. There is thus a need for a technique capable of reducing the possibility of collision when the preceding vehicle is executing a U-turn.

It is an object of the present disclosure to provide a technology to solve the above problem, and which can be implemented in the following forms.

According to one aspect of the present disclosure, a vehicle collision prediction apparatus is provided, which is installable to a host vehicle equipped with a peripheral sensor for detecting a preceding vehicle. The vehicle collision prediction apparatus includes a collision prediction region setting section that sets a collision prediction region in front of the host vehicle, and a collision prediction section which predicts that there is a probability of a collision between the host vehicle and the preceding vehicle, when the preceding vehicle is within the collision prediction region. If the preceding vehicle satisfies predetermined U-turn conditions for estimating that the preceding vehicle is executing a U-turn, the collision prediction region setting section expands the collision prediction region, making the collision prediction region larger than in response to the preceding vehicle not satisfying the U-turn conditions.

According to the vehicle collision prediction apparatus of this aspect, the collision prediction region setting section expands the collision prediction region in response to the preceding vehicle satisfying the U-turn conditions, making the region larger than in response to the preceding vehicle not satisfying the U-turn conditions, to thereby reduce the possibility of collision with a preceding vehicle that is executing a U-turn.

Hereinafter, embodiments of the present disclosure will be described with reference to the drawings.

A. First Embodiment

Figure 1:
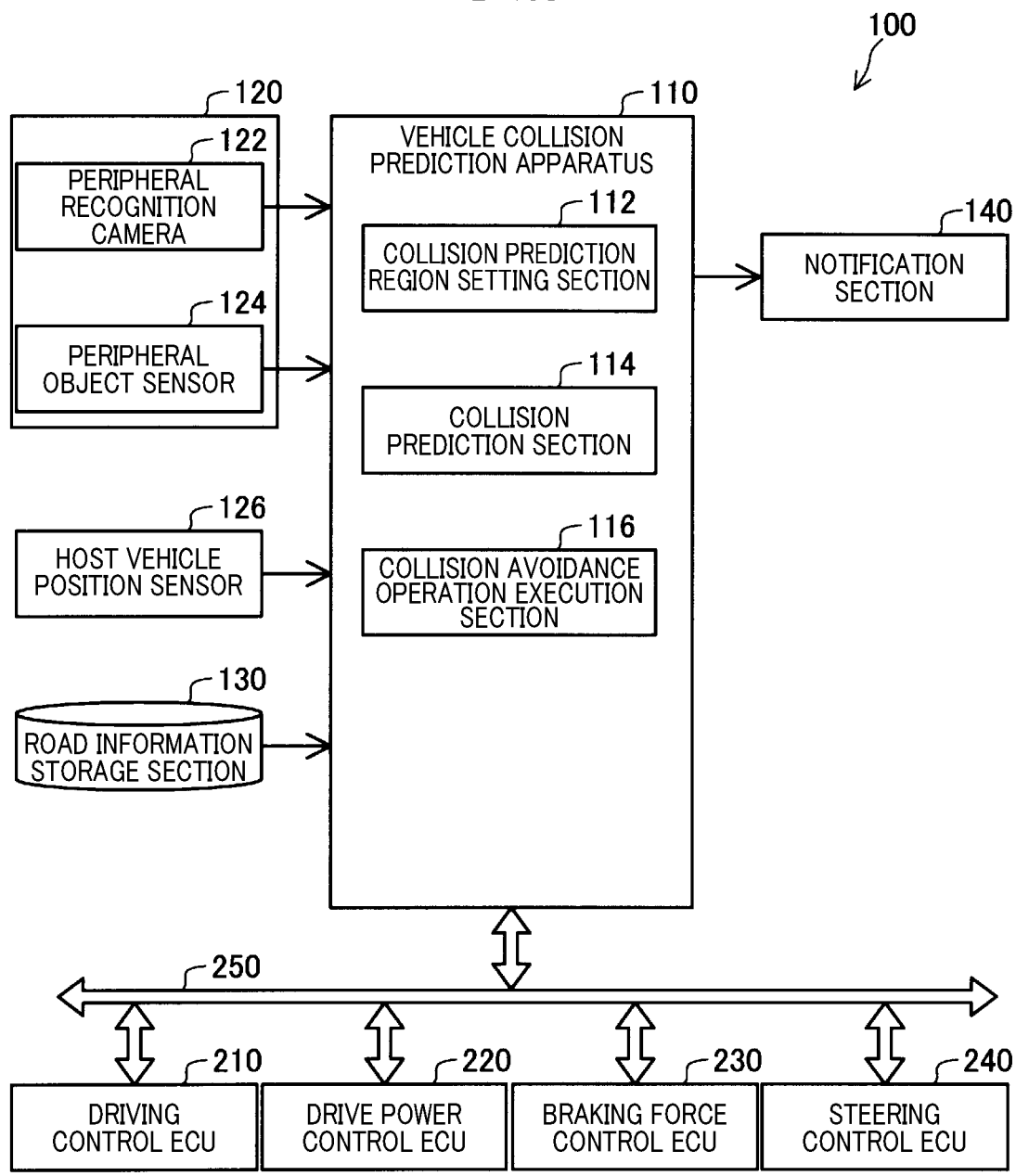
FIG. 1 is an explanatory diagram showing an outline of the configuration of an automatic driving system.

As illustrated in FIG. 1, a host vehicle 100 includes a vehicle collision prediction apparatus 110, a peripheral sensor 120, a host vehicle position sensor 126, a road information storage section 130, a notification section 140, a driving control ECU (Electronic Control Unit) 210, a drive force control ECU 220, a braking force control ECU 230, and a steering control ECU 240. The vehicle collision prediction apparatus 110, the driving control ECU 210, the drive force control ECU 220, the braking force control ECU 230, and the steering control ECU 240 are connected via an in-vehicle network 250.

The vehicle collision prediction apparatus 110 includes a collision prediction region setting section 112, a collision prediction section 114, and a collision avoidance operation execution section 116. The vehicle collision prediction apparatus 110 includes a microcomputer that includes a central processing section (CPU), a RAM, a ROM, etc., with the microcomputer implementing respective functions of these sections by executing a program that has been installed beforehand.

The collision prediction region setting section 112 sets a collision prediction region. In the present embodiment, the "collision prediction region" occupies a predetermined range in front of the host vehicle, and is used to predict whether there is a possibility of collision with a preceding vehicle. The setting of the collision prediction region will be described hereinafter. The collision prediction section 114 predicts whether there will be a collision with a preceding vehicle by using the collision prediction region set by the collision prediction region setting section 112 and a detection signal from the peripheral sensor 120. More specifically, the collision prediction section 114 judges whether there is a preceding vehicle within the collision prediction region, and, if all or part of a preceding vehicle is within the collision prediction region, the collision prediction section 114 judges that there is a possibility of collision with the preceding vehicle. If the collision prediction region setting section 112 predicts that there may be a collision with the preceding vehicle, the collision avoidance operation execution section 116 executes a predetermined collision avoidance operation. The collision avoidance operation may, for example, include an operation to output a signal to the notification section 140, for notifying the occupants of the host vehicle that there is a possibility of collision with the preceding vehicle.

The peripheral sensor 120 includes a peripheral recognition camera 122 and a peripheral object sensor 124. The peripheral recognition camera 122 captures images of the surroundings of the host vehicle. The peripheral object sensor 124 detects the conditions in the surroundings of the host vehicle. Examples of the peripheral object sensor 124 include an object sensor that uses reflected waves, such as a laser radar, a millimeter wave radar, and an ultrasonic sensor. In the present embodiment, the collision prediction region setting section 112 uses the images captured by the peripheral recognition camera 122 and the detection results from the peripheral object sensor 124 to judge the presence, position, size, distance, travel direction, speed, and yaw angular velocity of a preceding vehicle, and detects a collision margin time to collision (TTC) with the preceding vehicle. The collision prediction region setting section 112 may detect a part of this information through inter-vehicle communication with the preceding vehicle. The peripheral sensor 120 further detects the presence and positions of lane markings at the left and right of the travel lane, the conditions of traffic lights, and traffic signs.

The host vehicle position sensor 126 detects the current position of the host vehicle. Examples of the host vehicle position sensor 126 include a Global Navigation Satellite System(s) (GNSS) and a gyro sensor.

The notification section 140 is a device that notifies the driver of the possibility of collision with a preceding vehicle. The notification section 140 can be realized using, for example, a lamp such as an LED, a display device which displays characters or images, such as a car navigation system, or an audio device such as a loudspeaker. Alternatively, the notification section 140 may be realized by a device that issues notifications by vibrating the steering wheel or a seat. In the present embodiment, the notification section 140 includes a loudspeaker.

The road information storage section 130 stores detailed road information and the like, concerning the road on which the host vehicle is scheduled to travel. The stored road information consists for example of numbers of traffic lanes, lane widths, center coordinates of each lane, curvature values, stop line positions, and traffic light positions. The position of the host vehicle, including the lane in which it is traveling, is obtained from lane line positions that are detected by processing the images captured by the peripheral recognition camera 122, by a position signal from the host vehicle position sensor 126, and from road information that is read out from the road information storage section 130.

The driving control ECU 210 includes a microcomputer that includes a central processing section (CPU), a RAM and a ROM, etc., and implements an automatic driving function by executing a program installed beforehand.

The drive force control ECU 220 is an electronic control device that controls an actuator such as an engine which generates the drive force of the host vehicle. When the driver is driving the host vehicle manually, the drive force control ECU 220 controls the power source, such as an engine or an electric motor, in accordance with the degree of actuation of the accelerator pedal. On the other hand, when automatic driving is being performed, the drive force control ECU 220 controls the power source in accordance with a required drive force, which is calculated by the driving control ECU 210.

The braking force control ECU 230 is an electronic control device that controls a brake actuator, which generates the braking force of the host vehicle. When the driver is driving the host vehicle manually, the braking force control ECU 230 controls the brake actuator in accordance with the degree of actuation of the brake pedal. On the other hand, when performing automatic driving, the braking force control ECU 230 controls the brake actuator in accordance with a required braking force, which is calculated by the driving control ECU 210.

The steering control ECU 240 is an electronic control device that controls a motor which generates a steering torque of the host vehicle. When the driver is driving the host vehicle manually, the steering control ECU 240 controls the motor in accordance with the operation of the steering wheel, to generate an assist torque for the steering operation. As a result, the driver can steer the host vehicle by using only a small amount of force. On the other hand, when performing automatic operation, the steering control ECU 240 performs steering by controlling the motor in accordance with a required steering angle, which is calculated by the driving control ECU 210.

Figure 2:
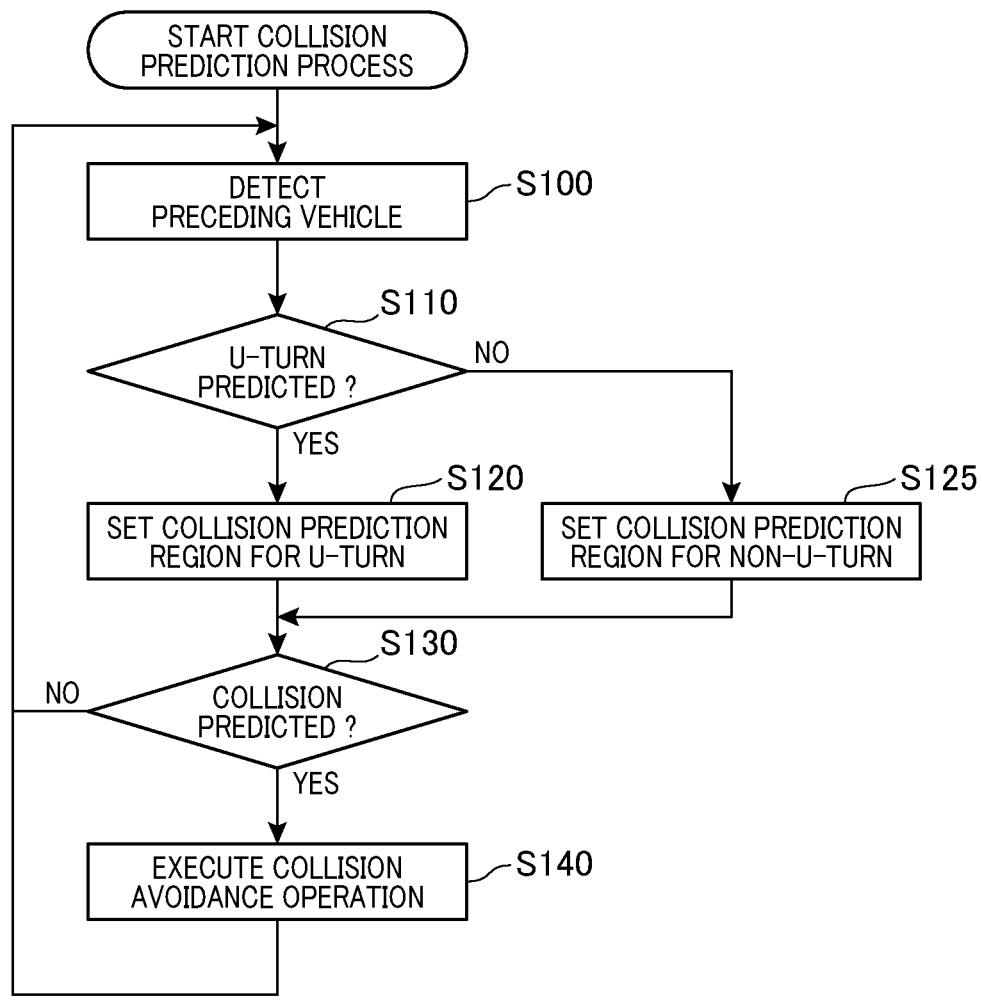
FIG. 2 is a flow diagram showing a collision prediction process.

The collision prediction process shown in FIG. 2 is a series of processing steps in which the collision prediction section 114 predicts whether there is a possibility of collision between the host vehicle and a preceding vehicle. This process is repeatedly executed by the vehicle collision prediction apparatus 110 while the host vehicle 100 is traveling.

First, the collision prediction region setting section 112 detects a preceding vehicle, in step S100.

More specifically, the position and speed of the preceding vehicle are detected from peripheral images of the preceding vehicle, captured by the peripheral recognition camera 122, and from the condition of the surroundings of the host vehicle, detected by the peripheral object sensor 124.

Figure 3:
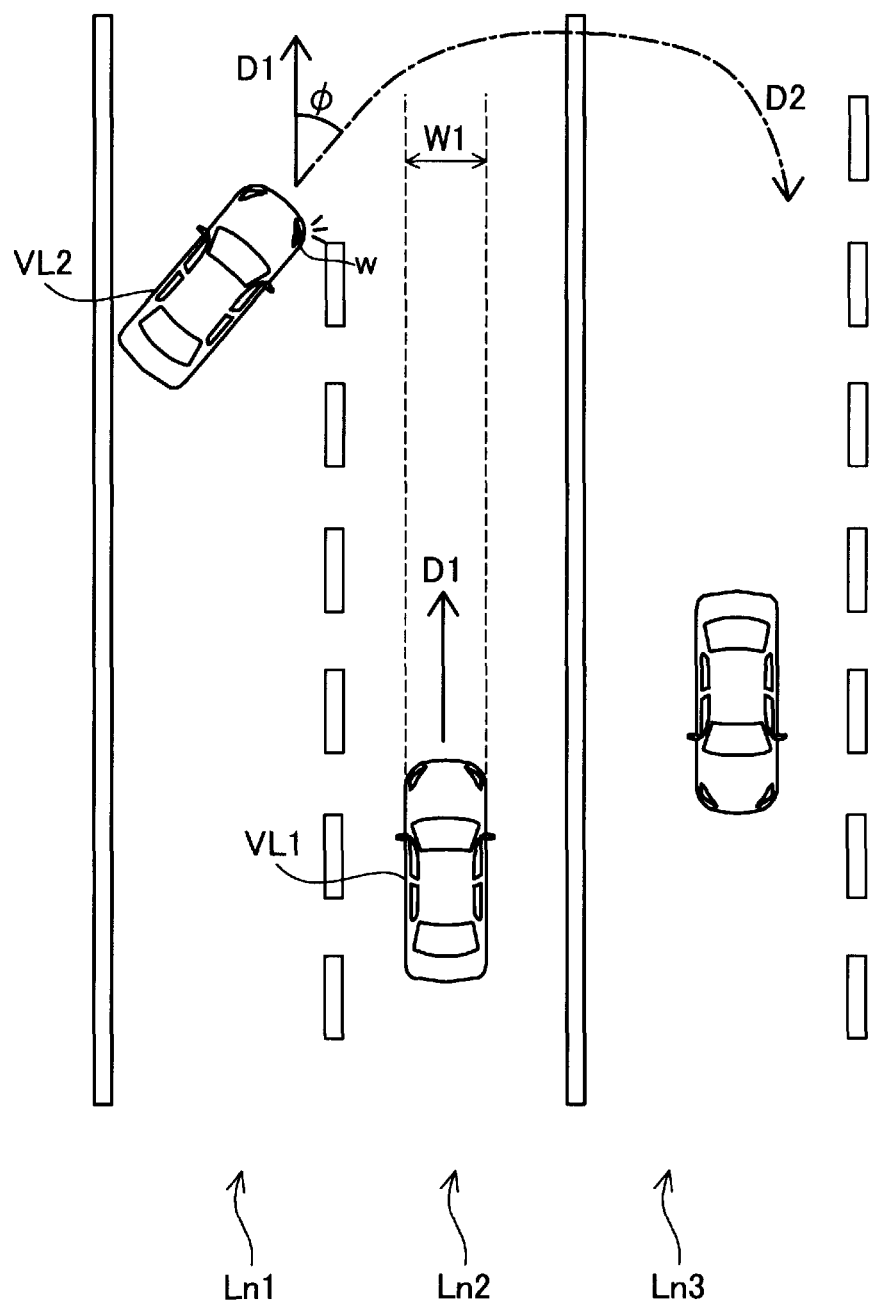
FIG. 3 is an explanatory diagram showing a case in which a preceding vehicle satisfies U-turn conditions.

Next, in step S110, the collision prediction region setting section 112 predicts whether the preceding vehicle detected in step S100 is executing a U-turn. More specifically, a judgement is made as to whether predetermined U-turn conditions for estimating that the preceding vehicle executes a U-turn are satisfied. The decision as to whether the preceding vehicle satisfies the U-turn conditions can be made by using the detection signals from the peripheral recognition camera 122 and the peripheral object sensor 124. One or more of the following conditions can be adopted as the U-turn conditions, for example. U-turn conditions are described in the following referring to FIG. 3. In FIG. 3, the host vehicle VL1 is traveling in a lane Ln2, a preceding vehicle VL2 is traveling in a lane Ln1 at the left side of the host vehicle VL1, and the oncoming lane Ln3 is at the right side of the host vehicle VL1. There is a possibility that the preceding vehicle VL2 may cross in front of the VL1 to make a U-turn.
<Condition 1>

The preceding vehicle VL2 is within a range that is on the opposite side of the host vehicle width range W1 of the host vehicle VL1 from the oncoming lane Ln3 of the host vehicle VL1.
<Condition 2>

The travel direction D2 of the preceding vehicle VL2 crosses the travel direction D1 of the host vehicle VL1 such as to face the oncoming lane Ln3.
<Condition 3>

The relative angle Φ of the preceding vehicle VL2 with respect to the travel direction D1 of the host vehicle VL1 is equal to or greater than a predetermined threshold value.
<Condition 4>

The rate of increase of the relative angle Φ is greater than or equal to a predetermined threshold value.
<Condition 5>

The turn signal w of the preceding vehicle VL2 that corresponds to the direction of the host vehicle VL1 is activated.
<Condition 6>

The speed of the preceding vehicle VL2 is less than or equal to a predetermined threshold value
<Condition 7>

The host vehicle VL1 is not traveling on an expressway.

If the above Condition 1 is not satisfied, and the preceding vehicle VL2 is within the host vehicle width range W1 of the host vehicle VL1, for example, then it is possible to judge the possibility of collision with sufficient reliability by using the usual collision prediction region. Hence, it is preferable to include this Condition 1 in the U-turn conditions.

If the above Condition 2 is not satisfied, the preceding vehicle VL2 is traveling in a straight line, so the probability of that vehicle executing a U-turn can be considered to be sufficiently small. Hence, it is preferable to include this Condition 2 in the U-turn conditions.

If the above Condition 3 is satisfied, the relative angle Φ with respect to the preceding vehicle VL2 is equal to or greater than the predetermined threshold value, so that the steering angle (yaw angle) of the preceding vehicle is large, and the preceding vehicle may move in a manner that obstructs the travel of the host vehicle. In the present embodiment, the "relative angle Φ" is the inferior angle formed by the travel direction D2 of the preceding vehicle VL2 with respect to the travel direction D1 of the host vehicle VL1, where the relative angle Φ takes a positive value when the travel direction D2 of the preceding vehicle VL2 is on the oncoming lane Ln3 side, and takes a negative value when the travel direction D2 of the preceding vehicle VL2 is not on the oncoming lane Ln3 side. The threshold value of Condition 2 can be determined beforehand by experiment, and can be set within 20 degrees or more to 45 degrees or less, for example.

If the above Condition 4 is satisfied, the relative angle Φ of the preceding vehicle VL2 is rapidly increasing, so that the preceding vehicle VL2 may move in a manner that obstructs the travel of the host vehicle VL1. In the present embodiment, the "rate of increase in the relative angle" is the amount of change in the relative angle Φ per unit of time, which takes a positive value when the relative angle Φ increases and takes a negative value when the relative angle Φ decreases. The threshold value of Condition 4 can be determined beforehand by experiment, and can be set, for example, within a range of 20 degrees/second or more to 90 degrees/second or less. Since Condition 4 has a high correlation with Condition 3, either of Condition 3 or Condition 4 may be used as a U-turn condition.

If the above Condition 5 is met, there is a possibility that the preceding vehicle VL2 will make a U-turn. However, since a turn indicator w of the preceding vehicle VL2 may be turned on when that vehicle is only performing a lane change, it is preferable to use Condition 5 as a U-turn condition in conjunction with other conditions.

If the above Condition 6 is not satisfied, the preceding vehicle VL2 cannot make a sudden U-turn, and hence it is preferable to include Condition 6 in the U-turn conditions. The threshold value of Condition 6 can be determined beforehand by experiment, and can be set to, for example, as 50% or less of the legal speed.

With the above Condition 7, the collision prediction region setting section 112 judges, for example, based on vehicle position sensor 126 and the road information storage section 130, that the host vehicle is not traveling on an expressway. Making a U-turn is not possible when traveling on an expressway, and hence the collision prediction region setting section 112 can predict when there is a possibility that the preceding vehicle VL2 may make a U-turn. It should be noted that it would be equally possible to judge that the preceding vehicle is traveling on an expressway if the speed of the host vehicle VL1 is equal to or higher than a predetermined value (for example, a value between 70 km/h or more and 80 km/h or less).

Furthermore, it would also be possible to constitute the U-turn conditions by combining the above conditions 1 to 7 with other conditions, as appropriate. In the present embodiment, the above Condition 1, Condition 2 and Condition 3 are used, and when all of these conditions 1 to 3 are satisfied, it is judged that the U-turn conditions are satisfied. When U-turn conditions that include the conditions 1 to 3 are used, the possibility that the preceding vehicle is executing a U-turn can be predicted with a high probability of accuracy. In addition, if the U-turn conditions include other conditions (for example, conditions 5 and 6) in addition to the conditions 1 to 3, the possibility that the preceding vehicle is executing a U-turn can be predicted with an even higher probability of accuracy.

If the preceding vehicle is not predicted to be executing a U-turn, that is, if the U-turn conditions are not satisfied, the collision prediction region setting section 112 sets a non-U-turn collision prediction region, in step S125. On the other hand, if it is predicted that the preceding vehicle is executing a U-turn, that is, if the U-turn conditions are satisfied, the collision prediction region setting section 112 sets a U-turn collision prediction region, in step S120. More specifically, the collision prediction region is set larger than the non-U-turn collision prediction region.

Figure 4:
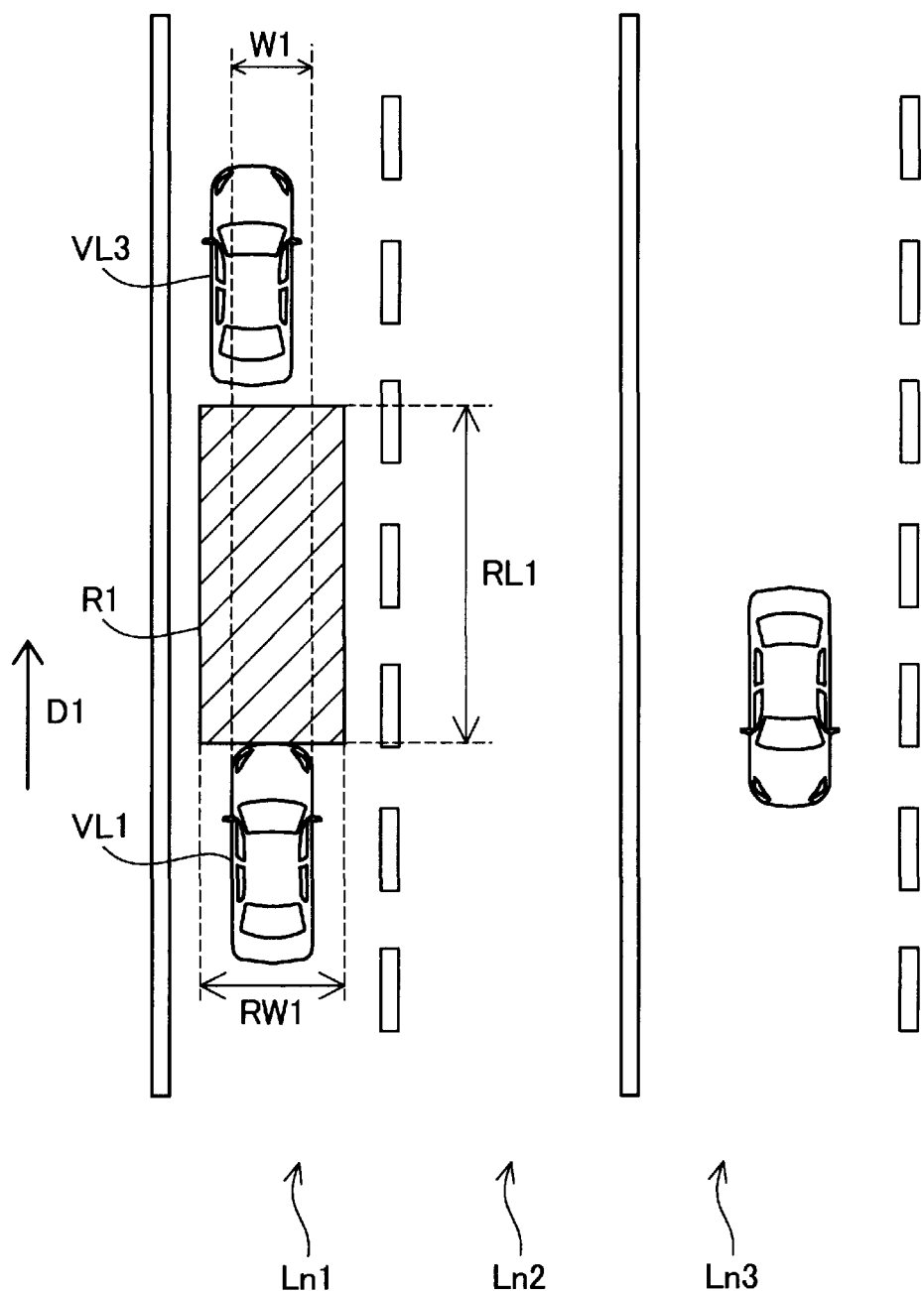
FIG. 4 is a diagram showing an example of a non-U-turn collision prediction region.
Figure 5:
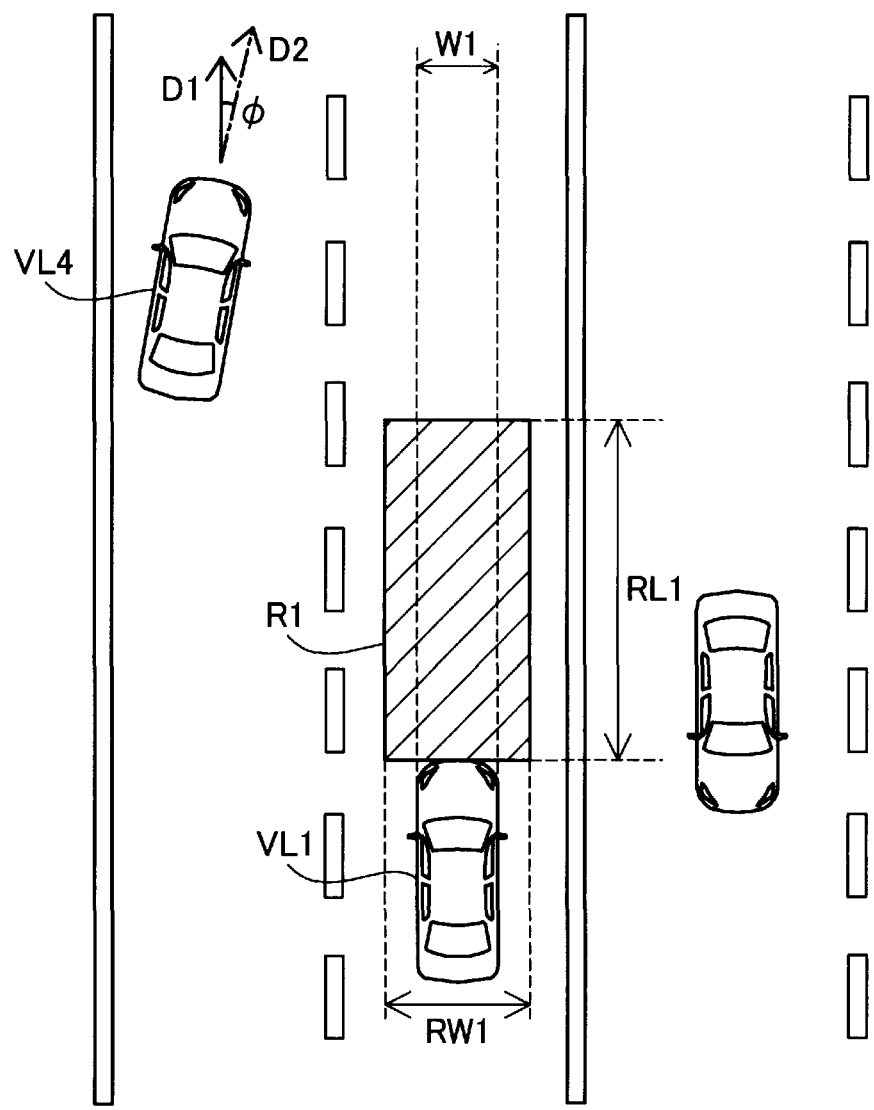
FIG. 5 is a diagram showing another example of a non-U-turn collision prediction region.

The preceding vehicle VL3 shown in FIG. 4 is within the host vehicle width range W1 in front of the host vehicle VL1, and hence does not satisfy the above Condition 1. The preceding vehicle VL4 illustrated in FIG. 5 does not satisfy the above Condition 3 because the relative angle Φ is equal to or less than the threshold value. The collision prediction region setting section 112 sets a collision prediction region R1 in front of the travel direction D1 of the host vehicle VL1. In the present embodiment, if the preceding vehicle VL3, VL4 does not satisfy the U-turn condition, the collision prediction region R1 can be set, for example, with a substantially rectangular shape, having a collision prediction region width RW1 and a collision prediction region length RL1. The collision prediction region width RW1 is a length that has been obtained beforehand by experiment, and is preferably equal to or greater than the host vehicle width of the host vehicle VL1. The collision prediction region width RW1 may be increased in accordance with the relative speed of the host vehicle VL1 with respect to the preceding vehicle VL3, VL4. The collision prediction region length RL1 can be calculated based for example on a map or a function which defines the relationship between the collision prediction region length RL1 and the relative speed of the host vehicle VL1 with respect to the preceding vehicle VL3, VL4, where the relationship is obtained beforehand by experiment. In the present embodiment, the "relative speed" is positive when the speed of the preceding vehicle VL3, VL4 is lower than that of the host vehicle VL1, and is negative when the speed of the preceding vehicle VL3, VL4 is higher than that of the host vehicle VL1.

Figure 6:
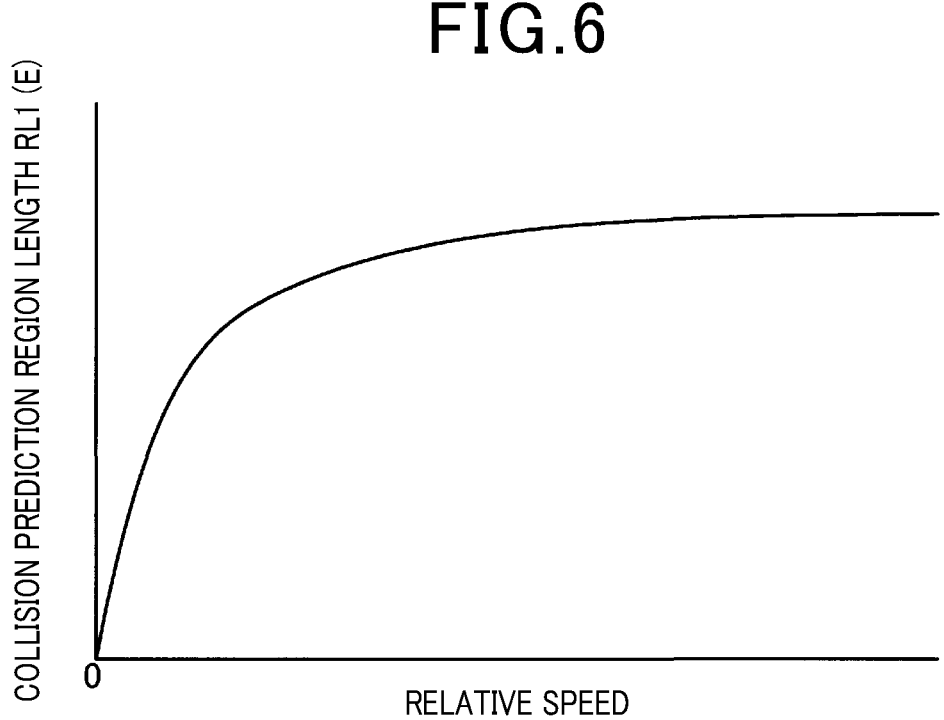
FIG. 6 is a graph showing the relationship between relative speed and collision prediction region length.

In FIG. 6, the vertical axis expresses values of the collision prediction region length RL1, and the horizontal axis expresses values of the relative speed between the host vehicle VL1 and the preceding vehicle VL3, VL4. As shown in FIG. 6, the collision prediction region length RL1 increases in accordance with increase of the relative speed.

Figure 7:
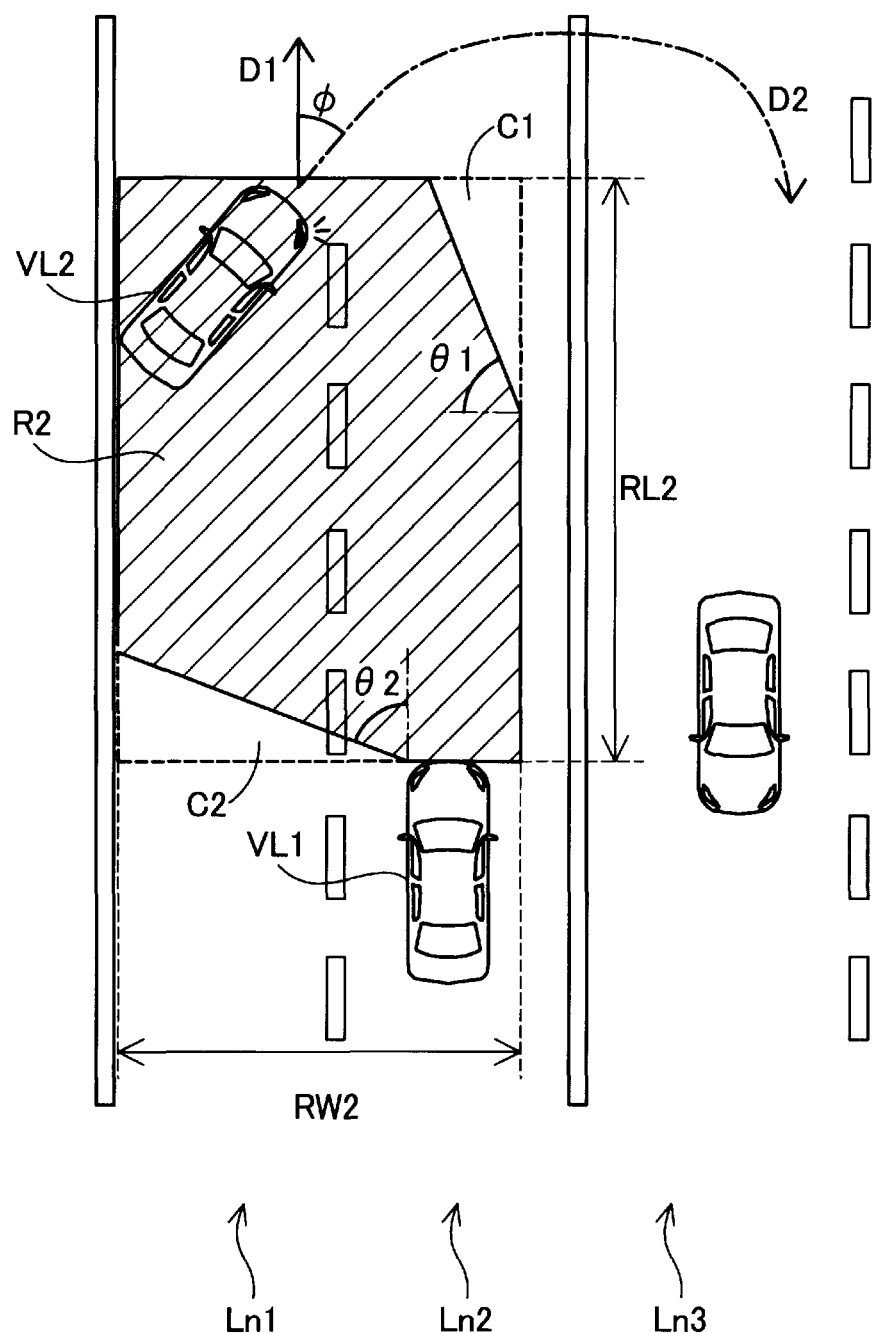
FIG. 7 is a diagram showing an example of a U-turn collision prediction region.

The preceding vehicle VL2 shown in FIG. 7 is outside the host vehicle width range W1 in front of the host vehicle VL1 and hence satisfies the above Condition 1. Furthermore, the relative angle $\Phi$ formed by the intersection of the travel direction D2 of the preceding vehicle VL2 with the travel direction D1 of the host vehicle VL1, directed toward the oncoming lane, is equal to or greater than the predetermined threshold value, so that the above Condition 2 and Condition 3 are satisfied, and hence the preceding vehicle VL2 satisfies U-turn conditions that include the conditions 1 to 3. When the preceding vehicle VL2 satisfies the U-turn conditions, the collision prediction region R2 is set wider than the collision prediction region R1 that is used when the U-turn conditions are not satisfied. It is preferable to set the collision prediction region R2 such as to extend beyond the collision prediction region R1, on the opposite side to the oncoming lane Ln3, in a direction intersecting the travel direction D1 of the host vehicle VL1. In the present embodiment, when the preceding vehicle VL2 satisfies the U-turn conditions, the collision prediction region R2 can for example be set to a substantially hexagonal shape, by means of the collision prediction region width RW2, the collision prediction region length RL2, and the predicted region angles $\theta 1$ and $\theta 2$. More specifically, of the four substantially rectangular corner portions formed by the collision prediction region width RW2 and the collision prediction region length RL2, a substantially triangular notch C1 is removed from the corner portion that is at the leading end, on the oncoming lane Ln3 side, while also a substantially triangular notch C2 is removed from the corner portion that is at the trailing end, on the opposite side from the oncoming lane Ln3 side. By providing the notch C1 at the leading end, it is made possible to prevent an prediction being made that there is a possibility of collision when the preceding vehicle VL2 has moved close to the oncoming lane Ln3 in order to perform a U-turn, and has thus made it unlikely that there will be a collision caused by that U-turn. Furthermore, by providing the notch C2 at the trailing end, it is made possible to prevent a prediction being made that there is a possibility of collision when the preceding vehicle VL2 is traveling in parallel with the host vehicle VL1, so that there is unlikely to be a collision with the preceding vehicle VL2. However, the collision prediction region R2 may be set to a shape other than the substantially hexagonal shape (for example, a substantially square shape).

In a similar manner to the collision prediction region length RL1, the collision prediction region length RL2 can be calculated, for example, based on a map or a function which defines the relationship between the collision prediction region length RL2 and the relative speed of the host vehicle VL1 with respect to another vehicle, where the relationship is obtained beforehand by experiment. The collision prediction region width RW2 can be calculated, for example, based on a map or a function which defines the relationship between the yaw angular velocity of the preceding vehicle and the collision prediction region width RW2, where the relationship is obtained beforehand by experiment. The predicted region angles $\theta 1$ and $\theta 2$ can be calculated, for example, based on, a map or a function that defines the relationship between the relative speed and lateral speed of the preceding vehicle VL2 and the predicted region angles $\theta 1$ and $\theta 2$. In the present embodiment, the "relative speed" is the difference in speed between the host vehicle VL1 and the preceding vehicle VL2 in the travel direction D1 of the host vehicle VL1, and the "lateral speed" is the speed of the preceding vehicle VL2 in a direction at right angles to the travel direction D1 of the host vehicle VL1. The predicted region angles $\theta 1$ and $\theta 2$ increase in accordance with increase of the relative speed, and in accordance with decrease of the lateral speed. The predicted region angles $\theta 1$ and $\theta 2$ are preferably between 0 degrees or more and 90 degrees or less. Furthermore, the predicted region angle $\theta 1$ and the predicted region angle $\theta 2$ may be identical.

Figure 8:
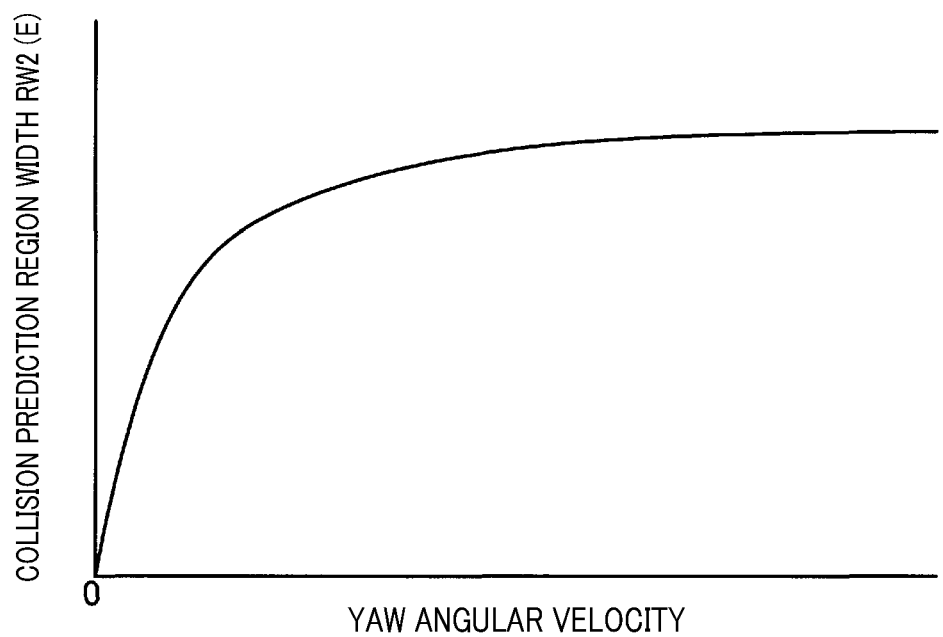
FIG. 8 is a graph showing the relationship between the yaw angular velocity of the preceding vehicle and the collision prediction region width.

In FIG. 8, the vertical axis represents values of the collision prediction region width RW2, and the horizontal axis represents values of the yaw angular velocity of the preceding vehicle VL2. As shown in FIG. 8, the collision prediction region width RW2 increases as the yaw angular velocity of the preceding vehicle VL2 increases.

Next, in step S130 (FIG. 2), the collision prediction section 114 predicts whether there is a possibility of collision with the preceding vehicle. More specifically, a judgement is made as to whether at least a part of the preceding vehicle is within the collision prediction region that has been set in step S120 or in step S125. If it is predicted that there is not a possibility of collision, that is, if the preceding vehicle is not within the collision prediction region, the processing returns to step S100. On the other hand, if it is predicted that there is a possibility of collision, that is, if the preceding vehicle is within the collision prediction region, the processing proceeds to step S140, and the collision avoidance operation execution section 116 executes a predetermined collision avoidance operation. The collision avoidance operation is an operation performed by pre-crash safety (Pre-Crash Safety (PCS (registered trademark)) control, which includes issuing a warning, executing automatic braking for avoiding a collision, executing automatic braking for mitigating an impact due to a collision, and executing automatic seat belt winding. In step S140, for example, the collision avoidance operation execution section 116 controls the notification section 140 to warn the occupants of the host vehicle that there is a probability of a collision.

With the vehicle collision prediction apparatus 110 of the present embodiment described above, when a preceding vehicle satisfies the U-turn conditions, the collision prediction region setting section 112 expands the collision prediction region, making that region larger than in response to the preceding vehicle not satisfying the U-turn conditions, thereby enabling the probability of a collision to be predicted by predicting that the preceding vehicle is executing a U-turn. In the above embodiment the case is envisaged in which, as a U-turn, a preceding vehicle VL2 traveling in the same travel direction D1 as the host vehicle VL1 crosses the travel region of the host vehicle VL1 and enters the oncoming lane Ln3, as shown in FIG. 3, however, the present disclosure is not limited to this, and may be applied, for example, to a U-turn in which another vehicle, traveling in the oncoming lane Ln3, enters the lane Ln2 in which the host vehicle VL1 is traveling B. Other Embodiments (B-1) In the above embodiment, the collision prediction section 114 sets the collision prediction region width RW2 in accordance with the yaw angular velocity of the preceding vehicle VL2, in step S120. However, alternatively, the collision prediction region width RW2 may be set in accordance with the relative angle Φ of the preceding vehicle VL2, the rate of increase of the relative angle Φ, or the lateral speed of the preceding vehicle VL2. The collision prediction region width RW2 can be made larger when the relative angle Φ is equal to or greater than the predetermined threshold value than when the relative angle Φ is less than the predetermined threshold value, for example.

(B-2) In the above embodiment, it would be equally possible for the collision avoidance operation execution section 116 to perform the above-described collision avoidance operation by lowering the speed of the host vehicle 100 based on the positional relationship between the host vehicle 100 and a preceding vehicle that is within the collision prediction region. For example, the collision avoidance operation executing section 116 may decrease the speed of the host vehicle 100 in accordance with increasing closeness between the preceding vehicle and the host vehicle 100.

The present disclosure is not limited to the above embodiments, and may be realized with various configurations without departing from the spirit of the present disclosure. For example, it would be possible to appropriately replace or combine the technical features in the embodiments corresponding to the technical features of each mode described in the summary of the invention, to solve the above problems or to achieve part or all of the above effects. Furthermore, technical features that are not described as essential in this specification may be deleted, as appropriate.

What is claimed is:

1. A vehicle collision prediction apparatus installable to a host vehicle equipped with a peripheral sensor for detecting a preceding vehicle;
the vehicle collision prediction apparatus comprising:
a collision prediction region setting section that sets a collision prediction region in front of the host vehicle; and
a collision prediction section which predicts that there is a probability of a collision between the host vehicle and the preceding vehicle, if the preceding vehicle is within the collision prediction region, wherein
in response to the preceding vehicle satisfying predetermined U-turn conditions for estimating that the preceding vehicle is executing a U-turn, the collision prediction region setting section expands a width of the collision prediction region toward a side that is opposite an oncoming travel lane of the host vehicle, in a direction that intersects a travel direction of the host vehicle, making the width larger than in response to the preceding vehicle not satisfying the U-turn conditions.

2. The vehicle collision prediction apparatus according to claim 1, wherein
the U-turn conditions comprise at least one of:
a first condition, that the preceding vehicle is within a range that is on an opposite side of a host vehicle width range of the host vehicle from an oncoming travel lane of the host vehicle;
a second condition, that the travel direction of the preceding vehicle intersects the travel direction of the host vehicle such as to face the oncoming travel lane; and
a third condition, that at least one of a relative angle formed by the travel direction of the preceding vehicle with respect to the travel direction of the host vehicle and a rate of increase of the relative angle is equal to or greater than a predetermined threshold value.

3. The vehicle collision prediction apparatus according to claim 2, wherein
the U-turn conditions further comprise at least one of:
a fourth condition, that a turn indicator of the preceding vehicle on the host vehicle side is turned on; and
a fifth condition, that a speed of the preceding vehicle is equal to or less than a predetermined threshold value.

4. The vehicle collision prediction apparatus according to claim 1, wherein
in response to the preceding vehicle satisfying the U-turn conditions and a yaw angular velocity of the preceding vehicle is equal to or greater than a predetermined threshold value, the collision prediction region is expanded to a greater extent than when the yaw angular velocity is less than the predetermined threshold value.

5. The vehicle collision prediction apparatus according to claim 1, further comprising:
a collision avoidance operation execution section that executes a predetermined collision avoidance operation in response to the collision prediction section predicting that the host vehicle and the preceding vehicle may collide.

6. The vehicle collision prediction apparatus according to claim 5, wherein
the collision avoidance operation execution section reduces a speed of the host vehicle based on a positional relationship between the host vehicle and the preceding vehicle that is within the collision prediction region.

7. The vehicle collision prediction apparatus according to claim 5, further comprising:
a notification section for issuing notifications to a driver of the host vehicle, wherein
in response to the collision prediction section predicting that the host vehicle and the preceding vehicle may collide, the collision avoidance operation execution section uses the notification section to issue a notification.

8. The vehicle collision prediction apparatus according to claim 1, wherein
the collision prediction region setting section increases an expansion amount of the collision prediction region as a relative speed between the preceding vehicle and the host vehicle increases.

9. A vehicle collision prediction apparatus installable to a host vehicle equipped with a peripheral sensor for detecting a preceding vehicle;
the vehicle collision prediction apparatus comprising:
a collision prediction region setting section that sets a collision prediction region in front of the host vehicle; and a collision prediction section which predicts that there is a probability of a collision between the host vehicle and the preceding vehicle, if the preceding vehicle is within the collision prediction region, wherein in response to the preceding vehicle satisfying predetermined U-turn conditions for estimating that the preceding vehicle is executing a U-turn, the collision prediction region setting section expands the collision prediction region, making the collision prediction region larger than in response to the preceding vehicle not satisfying the U-turn conditions, in response to the preceding vehicle satisfying the U-turn conditions and a yaw angular velocity of the preceding vehicle is equal to or greater than a predetermined threshold value, the collision prediction region is expanded to a greater extent than when the yaw angular velocity is less than the predetermined threshold value.

* * * * *